US007215362B2

(12) United States Patent
Klose

(10) Patent No.: US 7,215,362 B2
(45) Date of Patent: May 8, 2007

(54) AUTO-CALIBRATION OF MULTI-PROJECTOR SYSTEMS

(75) Inventor: Stefan Klose, Waltersdorf (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 502 days.

(21) Appl. No.: 10/696,945

(22) Filed: Oct. 30, 2003

(65) Prior Publication Data
US 2005/0083402 A1 Apr. 21, 2005

(30) Foreign Application Priority Data
Oct. 31, 2002 (DE) ............................. 102 51 217
Mar. 8, 2003 (EP) ................................. 03005195

(51) Int. Cl.
H04N 3/22 (2006.01)
H04N 3/26 (2006.01)
H04N 5/64 (2006.01)
H04N 5/74 (2006.01)
H04N 9/31 (2006.01)
H04N 13/04 (2006.01)
H04N 15/00 (2006.01)
H04N 17/00 (2006.01)
H04N 17/02 (2006.01)
G03B 21/00 (2006.01)
G03B 21/14 (2006.01)
G09G 5/00 (2006.01)

(52) U.S. Cl. .................... 348/189; 348/52; 348/177; 348/745; 348/750; 348/758; 348/778; 348/806; 348/807; 348/180; 345/1.1; 353/69

(58) Field of Classification Search ............ 348/52, 348/177, 180, 185, 187–192, 744, 806, 807, 348/750, 758, 778; 345/1.1; 353/69
See application file for complete search history.

(56) References Cited

U.S. PATENT DOCUMENTS

| 5,200,815 | A | * | 4/1993 | Tsujihara et al. | 348/181 |
| 5,475,447 | A | * | 12/1995 | Funado | 348/745 |
| 5,532,764 | A | * | 7/1996 | Itaki | 348/745 |
| 5,532,765 | A | * | 7/1996 | Inoue et al. | 348/807 |
| 5,699,440 | A | * | 12/1997 | Carmeli | 382/100 |
| 5,742,698 | A | * | 4/1998 | Minami et al. | 382/100 |
| 5,771,072 | A | * | 6/1998 | Tokoro et al. | 348/383 |
| 5,883,476 | A | * | 3/1999 | Noguchi et al. | 315/368.12 |
| 6,005,987 | A | * | 12/1999 | Nakamura et al. | 382/294 |
| 6,020,919 | A | * | 2/2000 | Fujii et al. | 348/190 |
| 6,061,102 | A | * | 5/2000 | Sheppard et al. | 348/745 |
| 6,219,011 | B1 | * | 4/2001 | Aloni et al. | 345/1.3 |
| 6,219,099 | B1 | * | 4/2001 | Johnson et al. | 348/383 |
| 6,222,593 | B1 | * | 4/2001 | Higurashi et al. | 348/745 |
| 6,340,976 | B1 | * | 1/2002 | Oguchi et al. | 345/690 |
| 6,437,522 | B1 | * | 8/2002 | Moon et al. | 315/368.13 |
| 6,456,339 | B1 | * | 9/2002 | Surati et al. | 348/745 |
| 6,462,777 | B1 | * | 10/2002 | Hamaguri | 348/188 |

(Continued)

FOREIGN PATENT DOCUMENTS

| WO | WO-0007376 | * | 2/2000 |
| WO | WO-0018139 | * | 3/2000 |

Primary Examiner—Brian P. Yenke
(74) Attorney, Agent, or Firm—Shumaker & Sieffert, P.A.

(57) ABSTRACT

The method for automatically calibrating a multi-projector system with at least two projectors, a digital camera and a control unit for controlling the projectors and the camera is performed according to the following steps:
production, capture and image-filtering of strip patterns, finding the largest projection surface possible, and calculation of warp fields and image-warping.

4 Claims, 9 Drawing Sheets

U.S. PATENT DOCUMENTS

Figure 1:
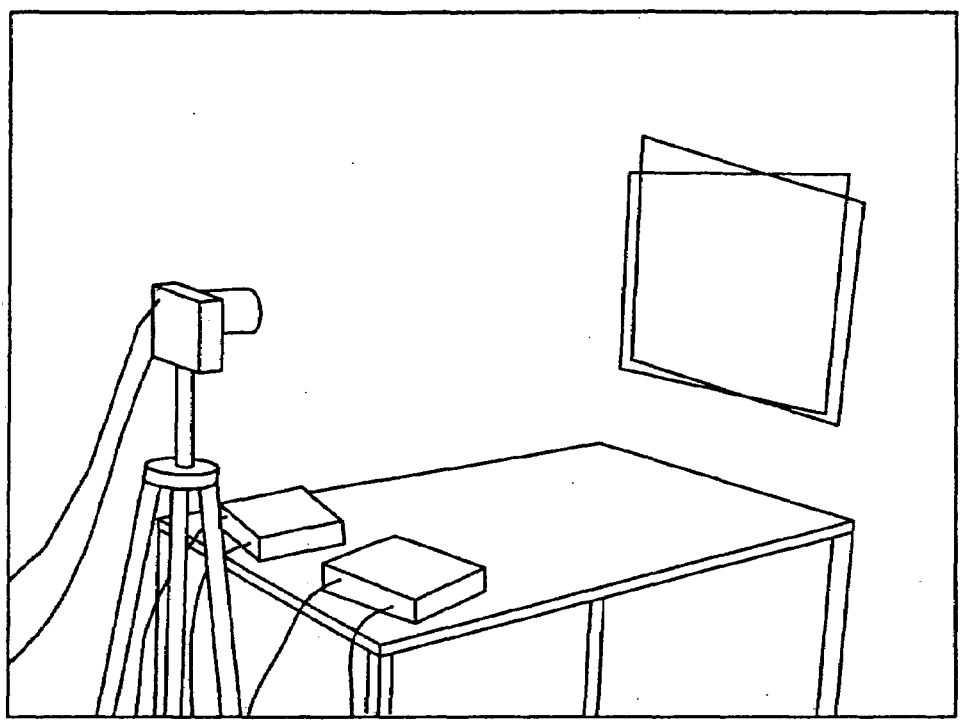

| | | | |
|---|---|---|---|
| 6,480,175 B1 * | 11/2002 | Schneider | 345/32 |
| 6,483,537 B1 * | 11/2002 | Mayer et al. | 348/180 |
| 6,483,555 B1 * | 11/2002 | Thielemans et al. | 348/745 |
| 6,493,044 B1 * | 12/2002 | Lee | 348/746 |
| 6,503,193 B1 * | 1/2003 | Iwasaki et al. | 600/140 |
| 6,538,708 B2 * | 3/2003 | Zhang | 349/40 |
| 6,618,076 B1 * | 9/2003 | Sukthankar et al. | 348/180 |
| 6,686,953 B1 * | 2/2004 | Holmes | 348/179 |
| 6,717,625 B1 * | 4/2004 | Thielemans | 348/745 |
| 6,753,907 B1 * | 6/2004 | Sukthankar et al. | 348/222.1 |
| 6,755,537 B1 * | 6/2004 | Raskar et al. | 353/94 |
| 6,804,406 B1 * | 10/2004 | Chen | 382/254 |
| 6,836,298 B2 * | 12/2004 | Song et al. | 348/745 |
| 6,940,529 B2 * | 9/2005 | Deering | 345/647 |
| 6,982,744 B2 * | 1/2006 | Jenkins | 348/189 |
| 6,995,810 B2 * | 2/2006 | Melton | 348/745 |
| 7,018,050 B2 * | 3/2006 | Ulichney et al. | 353/69 |
| 7,019,713 B2 * | 3/2006 | Hereld et al. | 345/1.1 |
| 7,079,157 B2 * | 7/2006 | Deering | 345/613 |
| 2003/0043303 A1 * | 3/2003 | Karuta et al. | 348/744 |
| 2004/0130669 A1 * | 7/2004 | Shin et al. | 348/744 |
| 2005/0110912 A1 * | 5/2005 | Song et al. | 348/806 |

* cited by examiner

AUTO-CALIBRATION OF MULTI-PROJECTOR SYSTEMS

The invention relates to a method for the automatic calibration of a multi-projector system, which allows to superimpose any number of images produced by different projectors with exact congruence of the pixels in order to increase the total luminosity or to facilitate a stereoscopic representation or to represent an image of several projection images overlapping accurately to the pixel on a (big) screen.

DESCRIPTION OF THE PROBLEMS

In order to increase the total luminosity of an image or to produce a passive stereoscopic image, it is necessary that several projectors illuminate the same area of the projection surface. With this image representation, there is the problem that the single images of the projection units normally are not superimposed. Presently, this calibration is made by hand and involves great efforts and is too imprecise.

For a long time, there has moreover been the desire to create a possibility to increase the pixel resolution of a projection beside the geometry rectification and the increase in luminosity. Since projectors with high resolutions (>1024×768) are very expensive, the obvious solution was to achieve this increase via several projectors. Typically, the associated problem was that it is impossible to position the projectors adjacent to each other without noticeable transition. Mostly, the projectors are oriented obliquely with respect to each other and have a brighter overlapping area.

These effects have to be compensated by means of a system calibration. The present state of the art is predominated by inflexible expensive manual calibration. There are, however, first attempts at an automatic calibration which, however, are less robust.

It is aimed at implementing an auto-calibration with exact congruence of the pixels which makes the troublesome manual fine adjustment superfluous. By this calibration, the projection surfaces are oriented to each other, distortions by the geometry of the projection surface are compensated for and the individual projectors are blended into each other such that the overlapping area is no longer perceptible and a projection consisting of n×m projectors appears as a single-projector display to the user.

U.S. Pat. No. 6,222,593 describes a multi-projector system where the projection image consists of several overlapping partial images each of which is projected by a different projector, the total projection image being picked up by a camera. The control of the projectors is effected in dependence on the respective distance and the respective orientation (rotation about three angles in space) of the projectors relative to the projection surface. Because of this merely global image transformation, the known system cannot be used with arbitrarily shaped projection surfaces.

Further multi-projection systems are described, for example, in WO-A-00/18139 and WO-A-00/07376 as well. Here, a calibration of the system is effected as well, but it is always assumed that the projection images are distortion-free, i.e., that the projection surface is plane and particularly vertical to the optical axes of the projectors and a camera.

It is an object of the invention to implement an auto-calibration with exact congruence of the pixels, which makes the troublesome manual fine adjustment superfluous. Additionally, this calibration also compensates for image distortions (with respect to the camera) caused by the geometry of the projection surface and the projector (Keystone), respectively.

In order to solve the afore-mentioned object, the invention suggests a method for the automatic calibration of a multi-projector system provided with at least two projectors for projecting images onto a projection surface, a digital camera for picking up the projection surface, and a control unit for controlling the projectors and the camera.

The auto-calibration is performed according to the following steps:
  projecting patterns of individual single strips of intersecting lines parallel in groups onto the projection surface by each of the projectors, the positions of the line intersection points of the single-strip patterns in the image to be projected being known,
  capturing the projected single-strip patterns by means of the camera,
  filtering the captured single-strip patterns for compensating for background noise, ambient light and/or optical distortions of the single-strip patterns caused by the camera and for detecting the line intersection points of the captured single-strip patterns,
  detecting the largest projection surface possible on the basis of the captured single-strip patterns,
  comparing the positions of the line intersection points within the captured single-strip patterns with the known position of the line intersection points of the single-strip patterns to be projected by the projectors in order to detect correction data for correcting distortions occurring as a consequence of unevennesses of the projection surface,
  calculating warp fields and image warping corresponding to the correction data.

In case of applying the invention to a projection system where the projection images of two (or more) projectors are superimposed as extensively as possible (e.g., for increasing the total luminosity of the projected image or for the stereoscopic representation), the largest projection surface possible is chosen as the largest common rectangular surface possible within the overlapping area of the projection surfaces of all the projectors. On this occasion, the projectors project the same image information onto the projection surface showing the superimposed projection images. Thereby, the luminosity on the projection surface is increased.

If, however, a projection system is concerned where the individual areas of a total projection image are produced by projectors projecting partial images, the individual partial projection images overlap each other. In this case, the maximum projection surface is that rectangular surface comprising all partial projection surfaces.

In the invention, standard PC technology, i.e., no expensive special hardware, is used. The projectors used (also referred to as beamers) are computer-controlled and available on the market.

The filtering of the strip patterns captured by the camera or by a common optical capturing device serves the image processing and compensates for distortions or other optical mistakes/shortcomings of the optical capturing device. When the lines of the strip patters have a width of, e.g., one pixel, that does unfortunately not mean that the lines captured by the capturing device are only one pixel wide; these lines rather have a width of several pixels. But in order to be able to compare the position of the intersection points of the projected lines with those of the intersection points of the captured projected lines, the intersection points (x/y coordinate of a pixel) have to be detected from the Aintersection fields@ by averaging. Besides, it has to be considered that the edges of the lines are serrated in the photograph when the projected lines do not exactly correspond with the row and column alignment of the pixels of the camera, which will be the normal case.

Hereinafter, the partial steps of the auto-calibration shall be explained with respect to the Figures.

Figure 2:
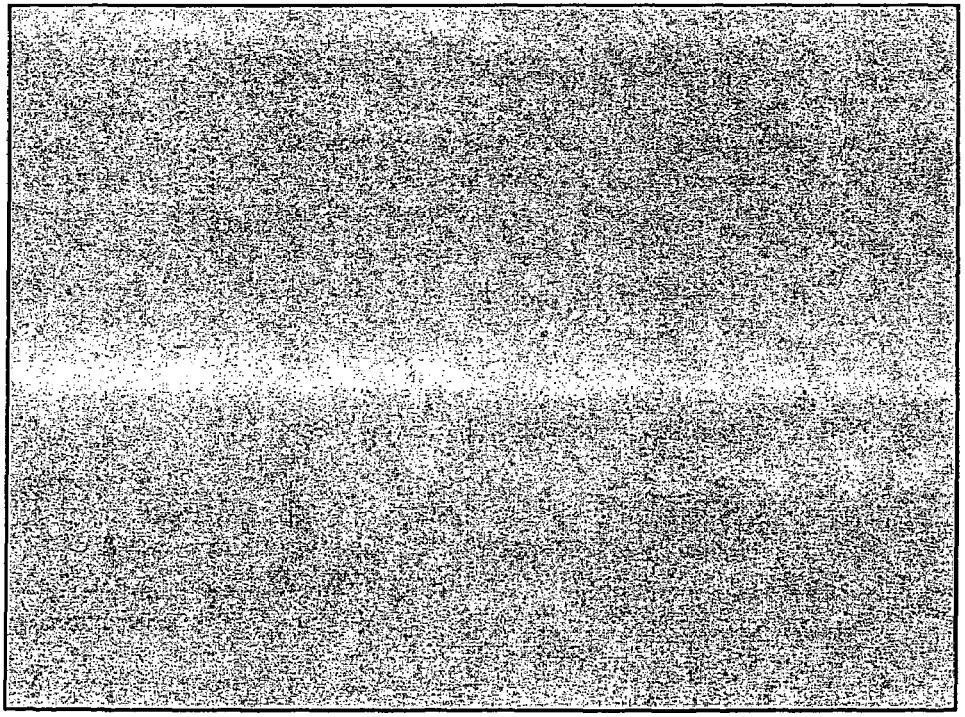
Figure 3:
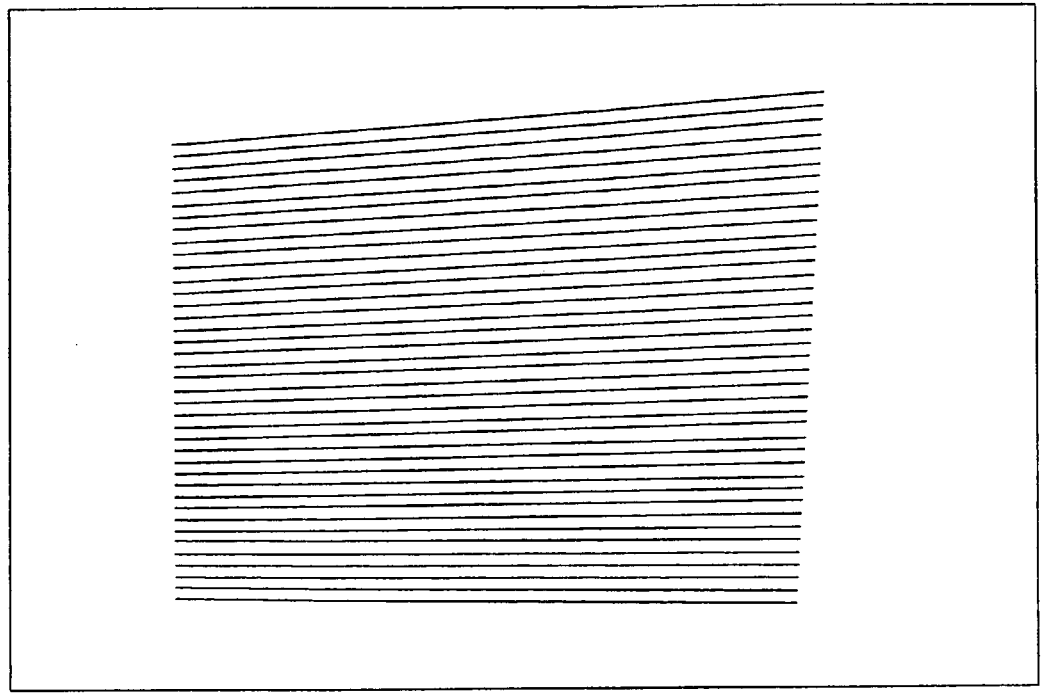
Figure 4:
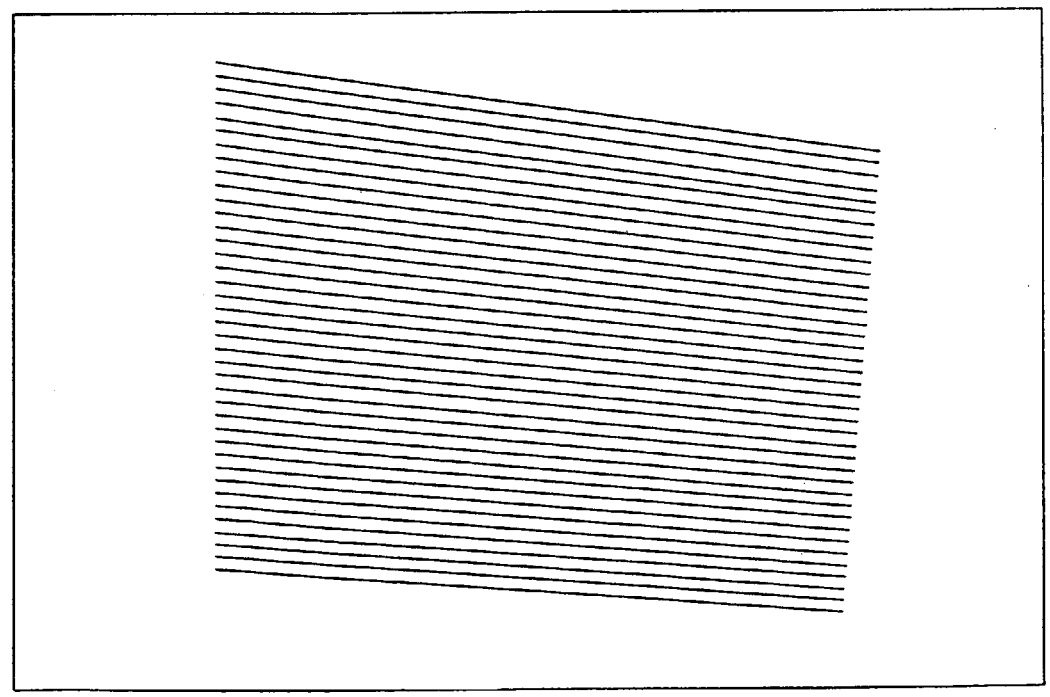
Figure 5:
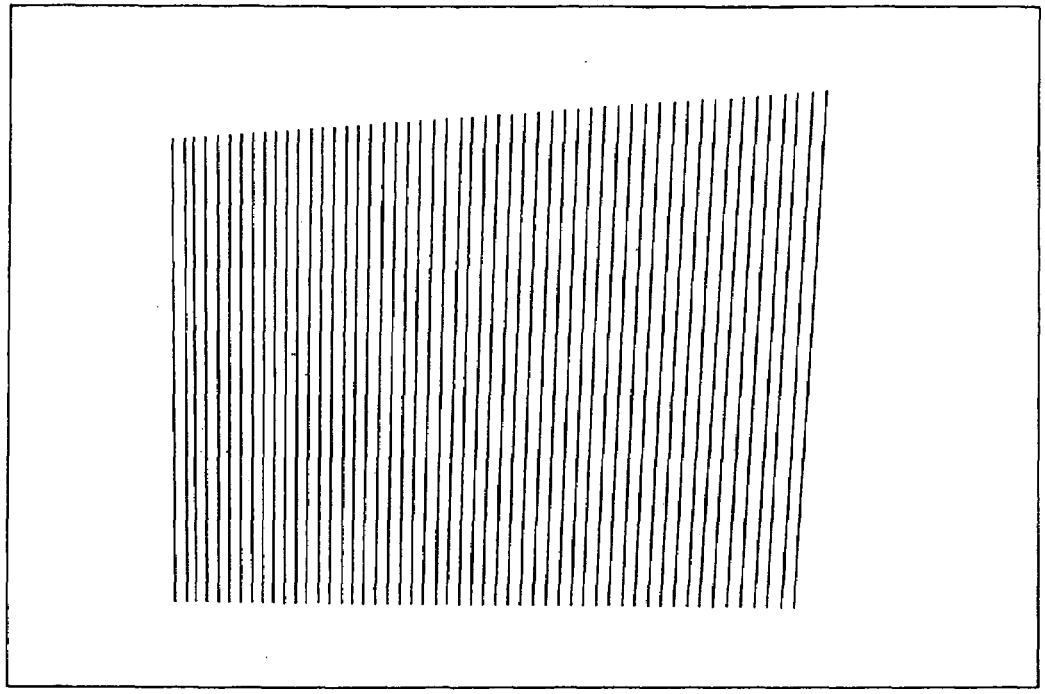
Figure 6:
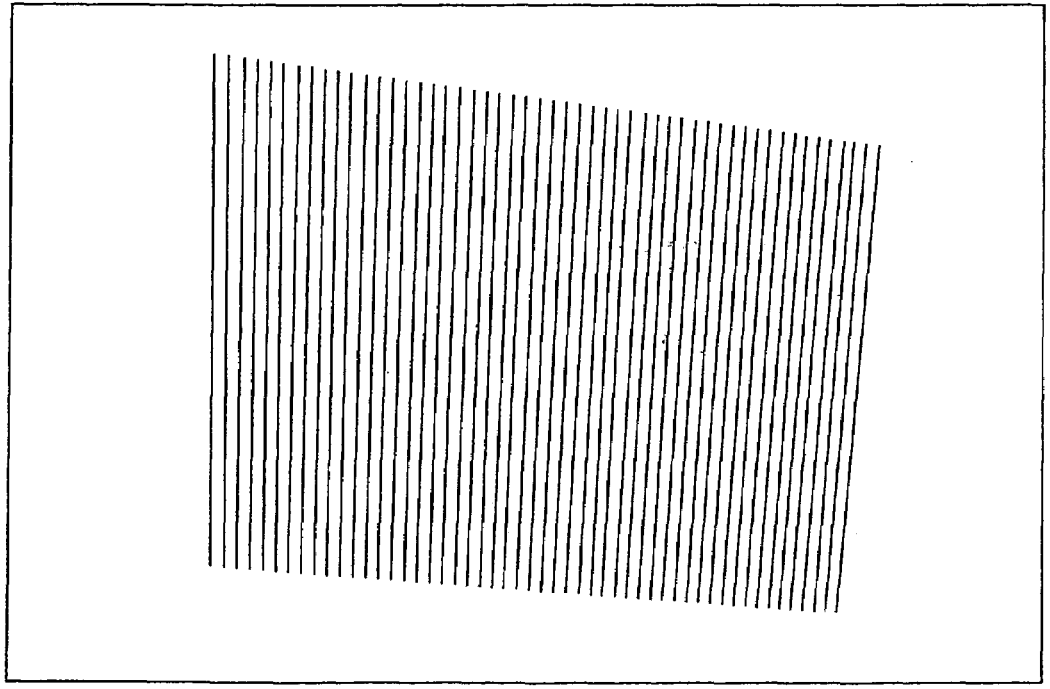
Figure 7:
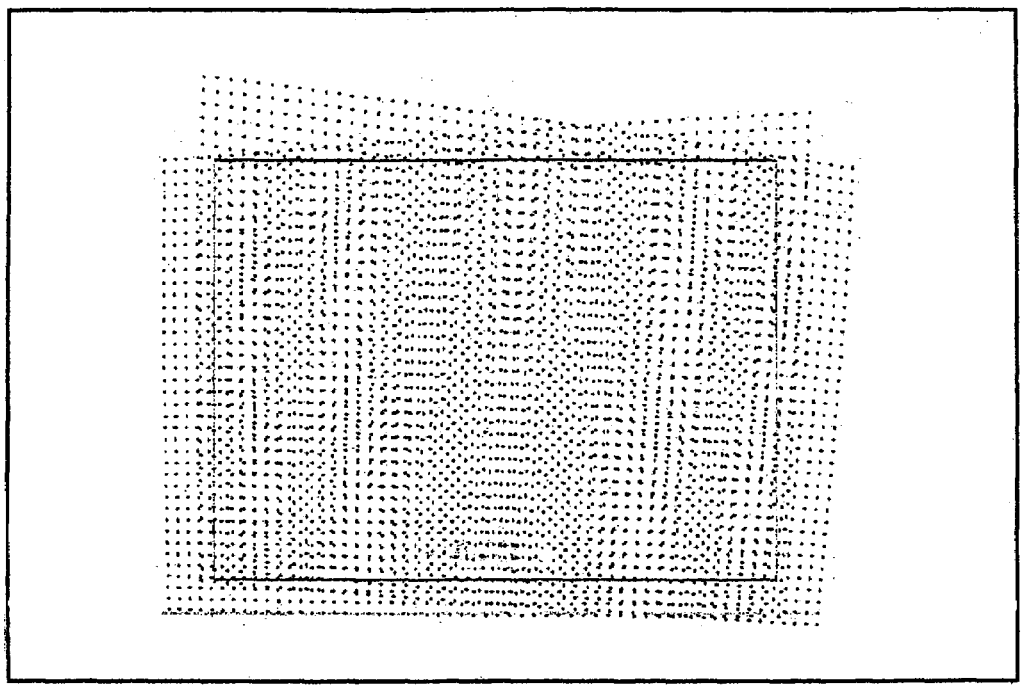
Figure 8:
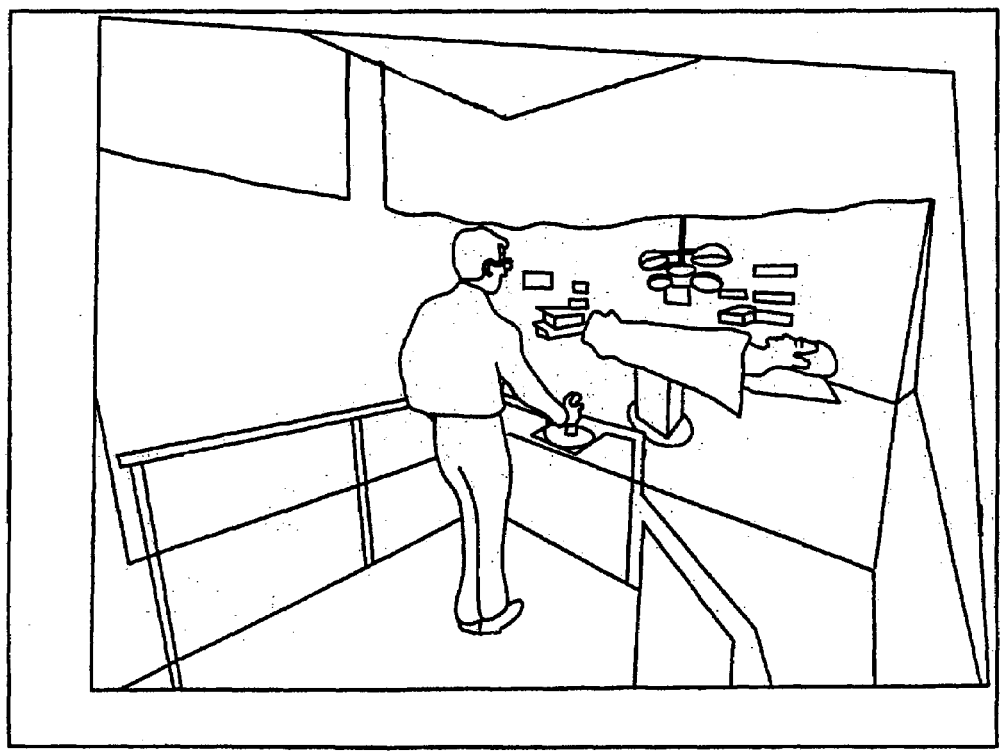
Figure 9:
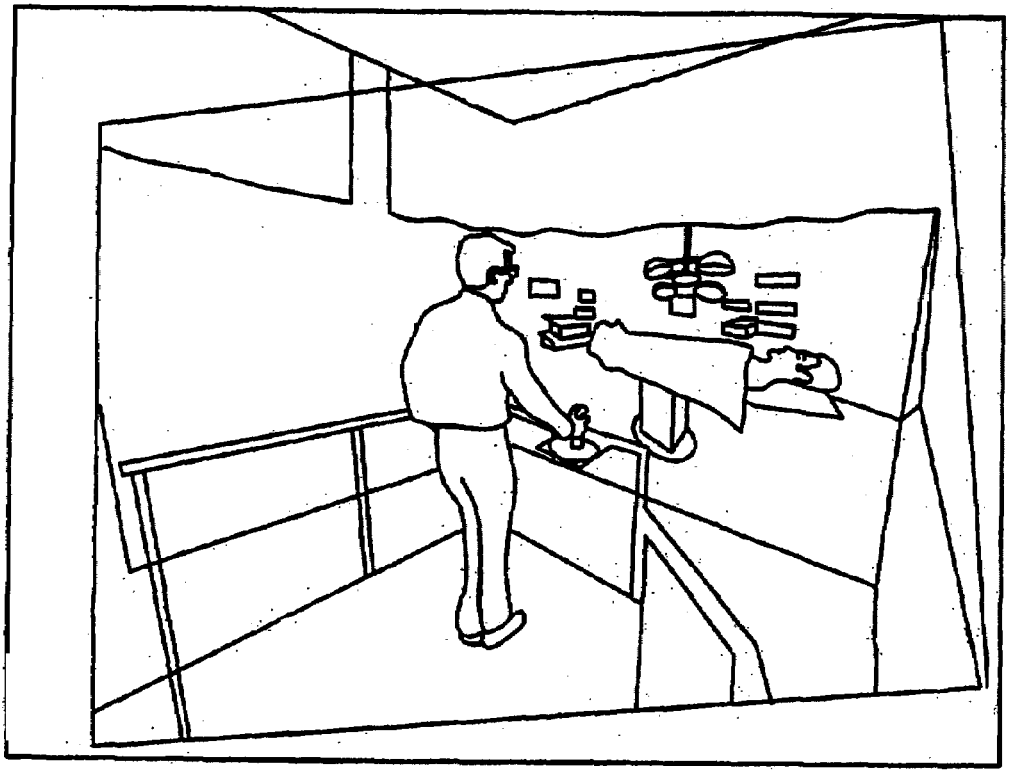
Figure 10:
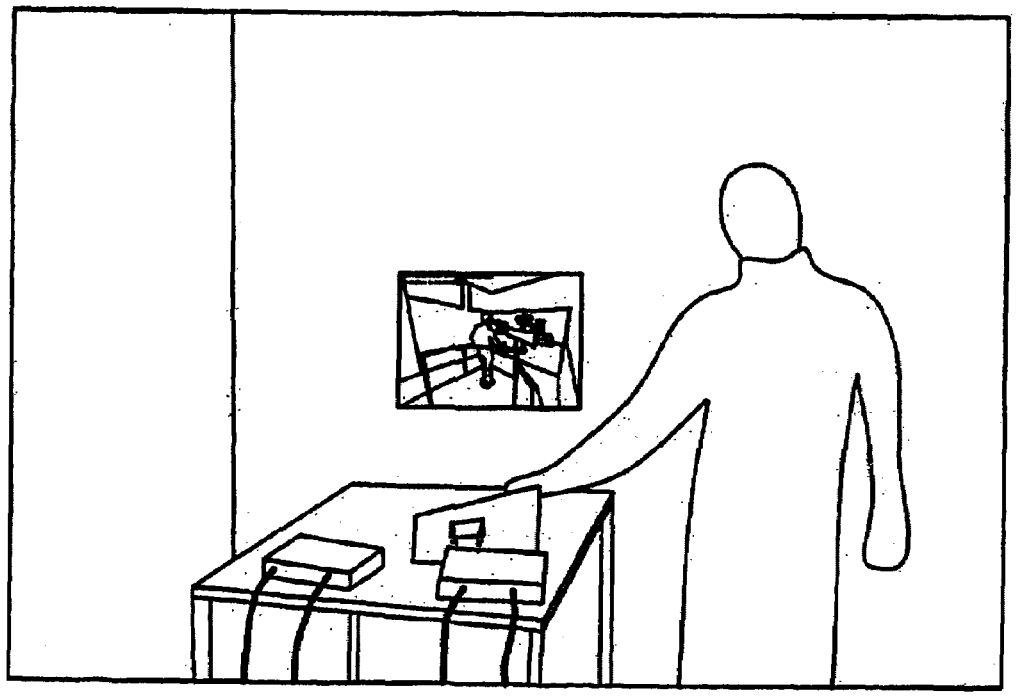
Figure 11:
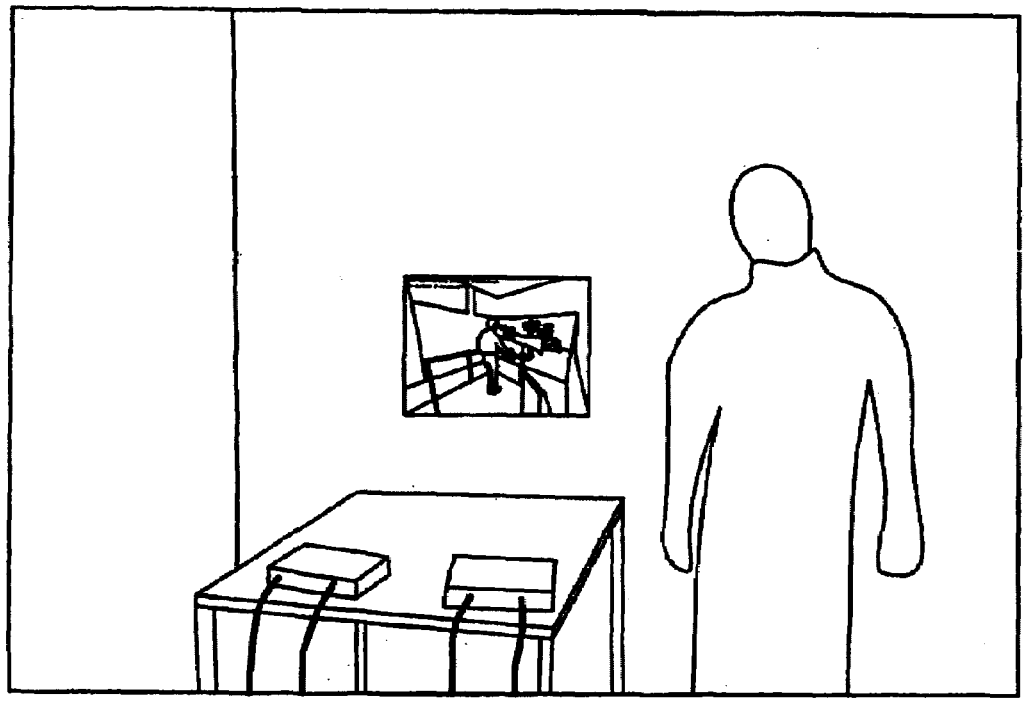
Figure 12:
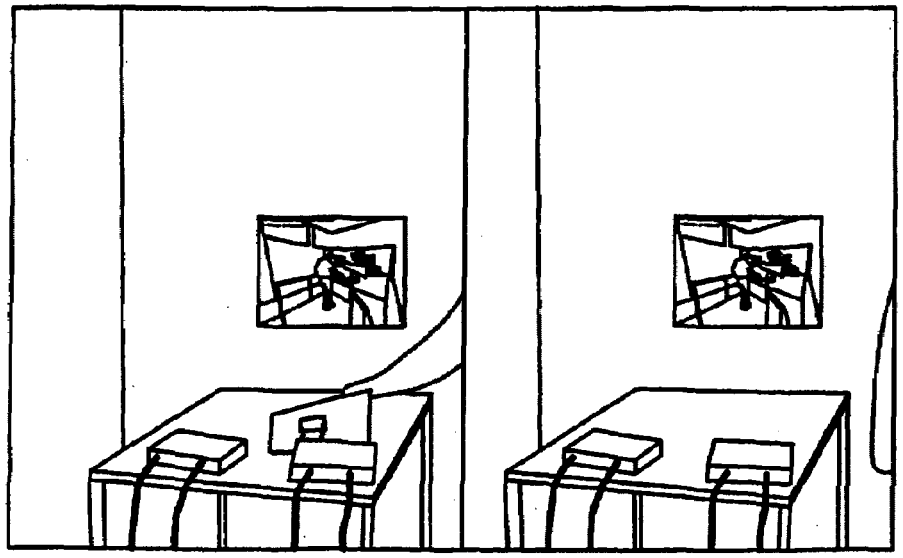
Figure 13:
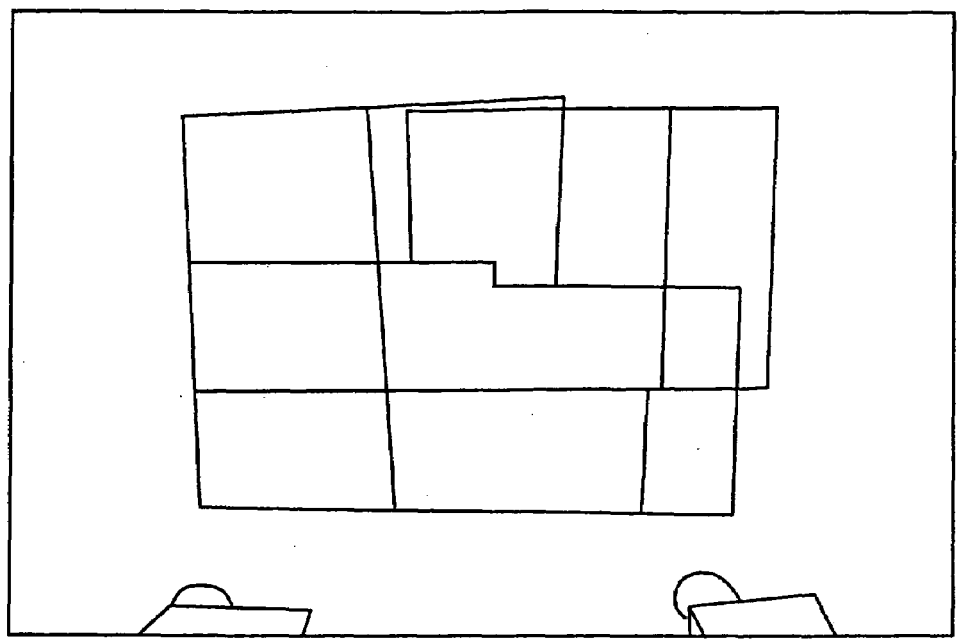
Figure 14:
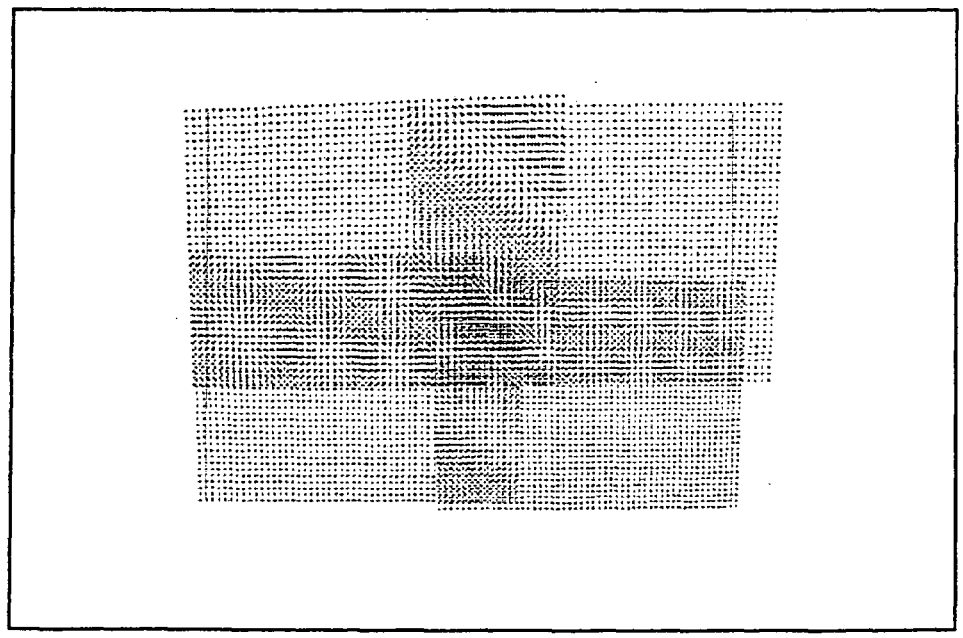
Figure 15:
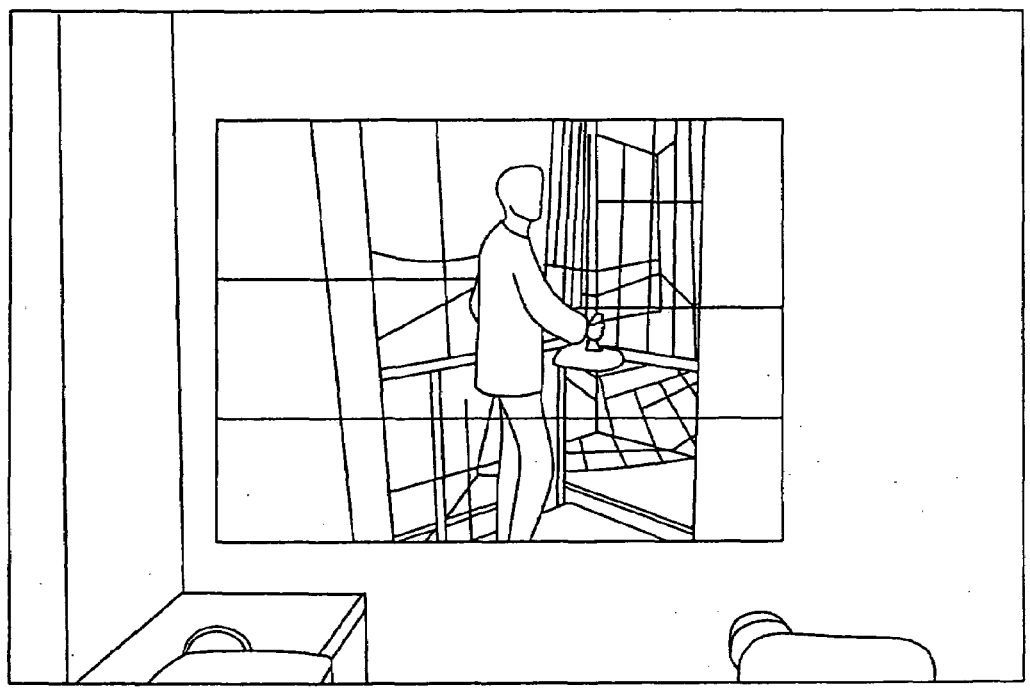
Figure 16:
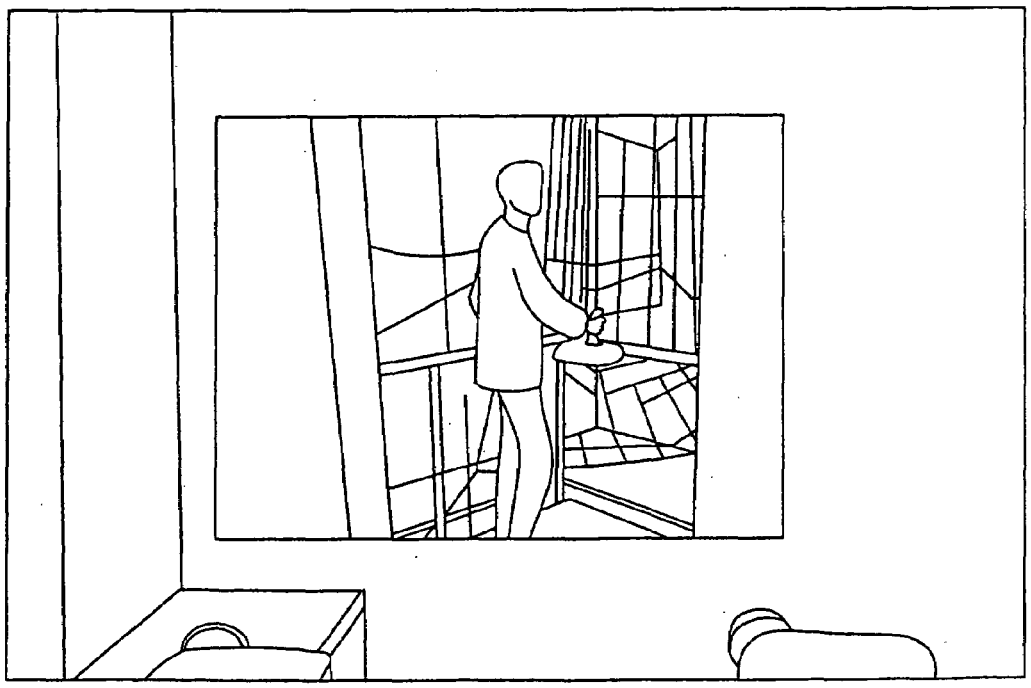
Figure 17:
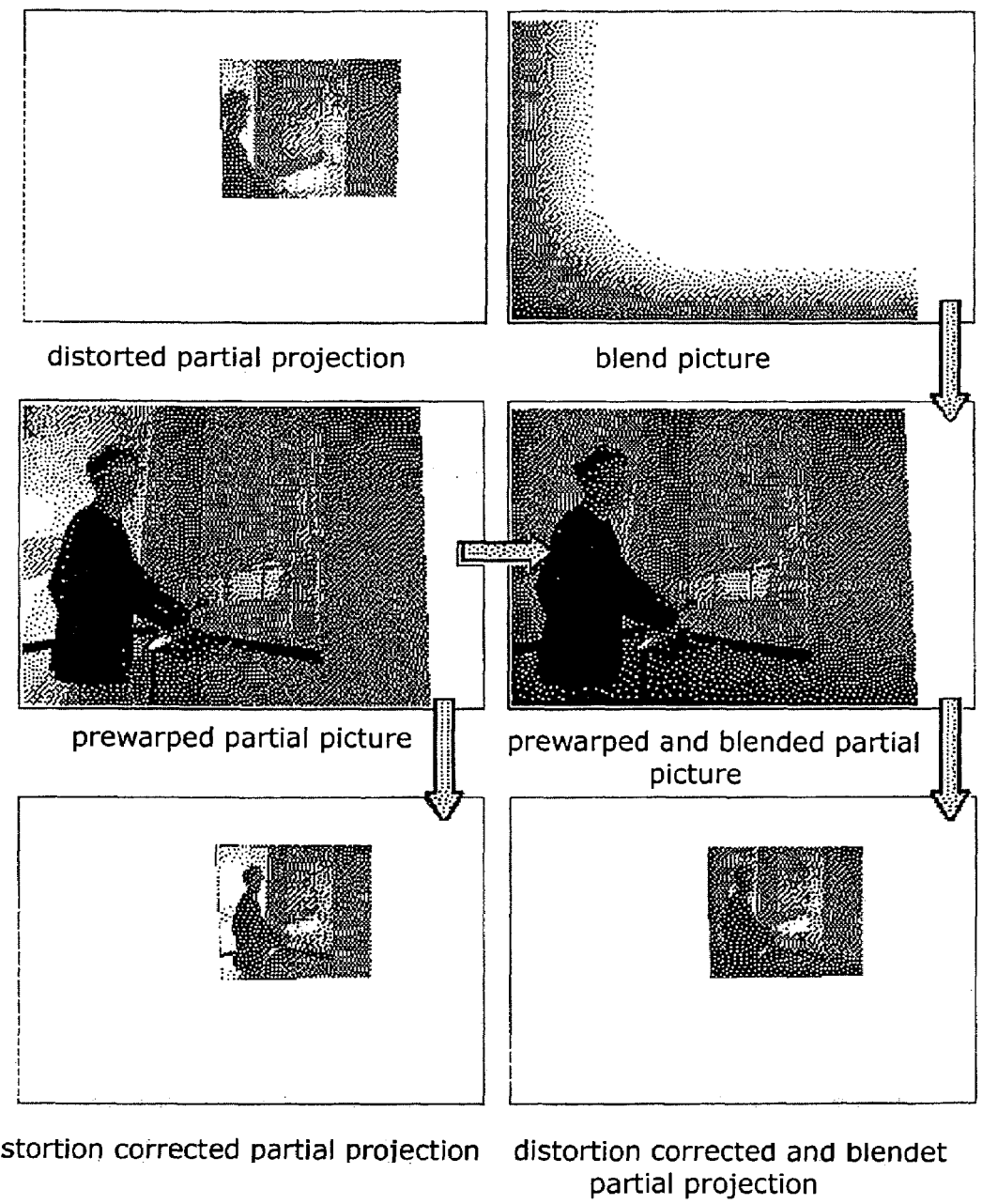

In the Figures:

FIG. 1 shows an experimental set-up with two projectors according to a first embodiment of the invention, FIG. 2 shows a background image (projection of two black surfaces), FIG. 3 shows a horizontal strip projection of the left projector of FIG. 1, FIG. 4 shows a horizontal strip projection of the right projector of FIG. 1, FIG. 5 shows a vertical strip projection of the left projector of FIG. 1, FIG. 6 shows a vertical strip projection of the right projector of FIG. 1, FIG. 7 shows a detected grid network and the largest common projection surface of the experimental set-up according to FIG. 1, FIG. 8 shows a warped image of the left projector of FIG. 1, FIG. 9 shows a warped image of the right projector of FIG. 2, FIG. 10 shows a rectified image of the left projector (the right projector is covered) of FIG. 1, FIG. 11 shows a rectified image of both projectors of the experimental set-up of FIG. 1 in superposition, FIG. 12 shows a comparison of the individual luminosity of the two projection images of the experimental set-up according to FIG. 1, FIG. 13 shows a distorted image of a 2×2 projector cluster according to a second embodiment of the invention, FIG. 14 shows the largest projection surface in the 2×2 projector cluster according to FIG. 13, FIG. 15 shows the rectified total image (without blending) of the 2×2 projector cluster according to FIG. 13, FIG. 16 shows the rectified total image (with blending) of the 2×2 projector cluster according to FIG. 13, and FIG. 17 shows partial results of the algorithms which are shown by way of example for a partial projection.

EMBODIMENT 1

Hereinafter, a first embodiment of the invention will be explained with reference to FIGS. 1 to 12, wherein the projection images of two projectors are superimposed nearly completely to produce stereoscopic images or projection images of increased total luminosity.

Producing, Capturing and Image Filtering of the Strip Patterns

To be able to perform a successful geometry rectification by means of image warping, the basic geometry of the projection surfaces has to be detected first. This is done by capturing projected vertical and horizontal strip patterns. These strips have a constant distance which has to be selected in dependence on the complexity of the geometry to be rectified. In the embodiment described herein, a strip distance of 20 pixels has been selected since the wall had many irregularities. Different strip distances and arrangements are possible. From the courses of the lines (curved, straight, oblique) and the line interspaces, the geometry of the projection surface can be inferred. For all projectors, the projected strips are captured by a digital camera (in our case, two projectors meaning two vertical and two horizontal strip images). Additionally, an image is captured where both projectors are switched to black to be able to remove the partly disturbing background and low noise, respectively, from the camera image. Before the image filtering continues, this background image is subtracted from all captured images. The captured images can be seen in FIGS. 2 to 6.

Due to the use of a lens camera, the captured images have typical radial distortions which have to be removed before the further processing. In case of a distortion-free capturing, this step can be omitted.

The actual filtering has been effected by standard image processing filter operations. After the image subtraction of image to be filtered and background image, the resulting image is transformed into shades of gray so that each of the three color channels has the same color value. Subsequently, this image is transformed into a black/white image in dependence on a threshold value, the strips being white and the background being black. A dilation and erosion is performed to remove holes in the strips. Subsequently, the lines still have to be filtered such that they are only one pixel wide. This is effected by means of a vertical and horizontal offset filter, respectively. This offset filter is performed in two directions (left and right and up and down, respectively). The average of the results of these two filtering operations yields the center of the strip. Now, the filtered strips are represented by their centers.

All filtering operations have been performed by means of pixel shaders known per se, with hardware assistance.

Calculation of the Largest Projection Surface Possible

To guarantee a convergent perception, the largest common projection surface of all projectors has to be determined in the original image ratio (4:3 in this embodiment). To this end, a grid network is produced from the filtered strip patterns first. By means of an optimizing algorithm, the largest common projection surface is looked for within this network which, in our case, consists of two partial grid networks. The grid of the left and right projectors as well as the target projection surface are illustrated in FIG. 7. From these data, the parameters for the warping can be determined subsequently.

Calculation of the Warp Fields and Image Warping

By means of the afore-calculated grid, the image can be split into warping patches. These patches consist of a dest patch (the image area into which an image section is to be warped) and a src patch (the image area warped into the dest patch).

The calculation of the corner points of the dest patches is trivial. Thus, the position of all the grid points in the target is known as well due to the given distance of the horizontal and vertical lines.

The src patches are calculated linearly in dependence on the projection rectangle (in the photo) and the position of the dest patches (in the photo). The calculation for the left lower corner of a src patch in dependence on the left lower corner of a dest patch is indicated:

patch.x1=(*pLB.X*−projectionRect.left)/(projectionRect.right−projectionRect.left);

patch.y1=(*pLB.Y*−projectionRect.bottom)/(projectionRect.top−projectionRect.bottom).

The src patch is transformed into the dest patch by means of a warping process including integrated perspective correction.

If the distance of the horizontal and vertical lines is selected to be relatively small, it is also possible to realize the compensation of curvatures. It has already been possible to compensate for curvatures of the wall with the line distances of twenty pixels selected in the experiments so that the projected image on the curved projection surface appears to the viewer (from the camera) as being projected onto a plane surface.

In case of a calibration of two projectors, two warp arrays have to be calculated, in case of more than two projectors correspondingly more. The warp arrays are always determined in dependence on the corresponding grid points, with the restriction of the common largest projection surface. The warped images calculated for a two-channel projection can be seen in FIGS. 8 and 9. The result at the projection surface for one projector can be seen in FIG. 10 and for two projectors in FIG. 11. The comparison of the luminosity is illustrated in FIG. 12.

To ensure an effective processing, the auto-calibration is made only once (per session). For this reason, the data calculated for the geometry rectification and multi-projector calibration are stored in warp fields which can be used by the X-Rooms™ system (K. Isakovic, T. Dudziak, K. Köchy. *X-Rooms. A PC-based immersive visualization environment*, Web 3D Conference, Tempe, Ariz., 2002). The rectification by means of the warp fields has been done by hardware assistance again so that a rectification in real time is possible.

Application Fields

There are many application fields for a multi-projector calibration. It can be used, for example, for a cost-effective luminosity increase or for stereoscopic calibration. Furthermore, a rectification necessitated by the geometry and the projector can be performed without any great problems. Experiments in practice have shown that the auto-calibration of a two-projector system by means of the method according to the invention takes only about 35 seconds including the image capturing (approximately 20 seconds). Thus, the invention represents a significant increase with respect to the manual calibration.

EMBODIMENT 2

In the following text, an extension of the afore-described method for the auto-calibration of multi-projector systems is presented with respect to FIGS. 13 to 17. While the possibility of superposing any number of images with exact congruence of the pixels has been described in detail above, the ability of the system of automatically calibrating projector clusters present as n×m projector matrix will be described in the present text.

For a long time, there has existed the desire of an increase in the pixel resolution of a projection beside the geometry rectification and the increase in luminosity. Since projectors with high resolutions (>1024×768) are very expensive, the obvious solution was to achieve this increase via several projectors. Typically, the associated problem was that it is impossible to position the projectors adjacent to each other without noticeable transition. Mostly, the projectors are oriented obliquely with respect to each other and have a brighter overlapping area (see FIG. 13).

These effects have to be compensated for by a system calibration. The present state of the art is predominated by inflexible expensive manual calibration. There are, however, first attempts at an automatic calibration which, however, are less robust.

It is aimed at implementing an auto-calibration with exact congruence of the pixels which makes the troublesome manual fine adjustment superfluous. By this calibration, the projection surfaces are oriented to each other, distortions by the geometry of the projection surface are compensated for and the individual projectors are blended into each other such that the overlapping area is no longer perceptible and a projection consisting of n×m projectors appears as a single-projector-display to the user.

Producing, Capturing and Image-Filtering of the Strip Patterns

This part of the method has already been described above. Therefore, it is not intended to go into further details here.

Calculation of the Largest Projection Surface Possible

To guarantee a convergent perception, the largest common projection surface of all projectors has to be determined in the original image ratio. This image ratio is determined from the number of projectors and the arrangement thereof. A cluster with 3 projectors in horizontal direction, for example, has an image ratio of 12:3, the 2×2 system presented in detail herein a ratio of 4:3.

From the strip patterns filtered before, a grid network is produced again. The largest overlapping projection surface found automatically by the optimization algorithm as well as the grid network on which it is based are illustrated in FIG. 14.

Calculation of the Warp Fields and Image Warping

The matrices used for the warping of the partial images are calculated according to the above-described method again. The rectified total image (still without blending of the overlapping areas) is shown in FIG. 15.

Blending of the Overlapping Projectors

The total image produced by the image warping appears already geometrically homogeneous, but has a greater luminosity at the overlapping areas. Therefore, it can still be identified as a composed image very easily. It is the aim of the blending to change this overlapping area such that the image appears homogeneous as to color as well.

During the pre-processing, a blended image in the color white is produced for each projector. This image has the total resolution (i.e., 2048×1536 pixels in case of 2×2 projectors) and is warped into an image with projector resolution (1024×768) after the blending values have been calculated, and subsequently, it is used as a masking texture (multiplication of the already warped image in current graphic hardware per multi-texturing).

In the first step for the calculation of the blending values, the grid data of the individual projectors are arranged in a n×m matrix so that they are sorted according to their positions. In the next step, n projectors (2 in our case) are blended with each other horizontally. To this end, a lower and an upper limit is determined across the projection rectangle as well as all the projector grid data (per horizontal strip). These limits lie within the projection surface and within the n projection surfaces to be blended and further, they are parallel to the projection surface. This limit simplifies the blending to be a simple scan line process.

The horizontal scan line blending is always effected between 2 overlapping images. The right edge is represented by the right edge of the left partial image, the left edge by the left edge of the right partial image. Per line, a linear color value decrease is effected from the starting to the final point. The color values already listed in the blending image—so that a multiple blending is possible as well—and a multiplication factor determined per pixel of the scan line (over the entire scan line of 1.0 60.0) serve as a basis for this color value decrease. Subsequently, the linear blending values determined in this manner are provided with a gamma correction (linBlend$^{1.0/gamma}$). This gamma value depends on the projector and can be indicated for each color channel (RGB). The definitely calculated blending value is stored both in the left and the right blending image—depending on the starting and final points of the scan line. Due to the different start and final values (the starting point in the left partial image corresponds to the final value in the right partial image), a so-called cross fade with integrated gamma correction is created.

Subsequently, all values of the blending image below the lower limit and above the upper limit, respectively, are blackened.

After the horizontal blending of all strips (2 in our case), a vertical blending still has to be performed. This is also done by the scan line process, here, however, the starting value and final value per vertical scan line are defined by the upper limit of an already horizontally blended strip and the lower limit of the strip arranged above and already blended horizontally.

The blending images in total projection size now available are transformed into n×m blending images in projector resolution by means of image warping and the already available warp arrays. Now, these blending images can be used in real time for the blending of multi-projector systems by means of multi-texturing.

The result of the blending of a 2×2 projector cluster can be seen in FIG. 16. By way of example, FIG. 17 shows a surview of all operational steps at a partial image:

- distorted partial image on the projection surface (upper line, left picture),
- pre-warped partial image (middle line, left picture),
- associated blending image (upper line, right picture)
- pre-warped partial image multiplied with the blending image (middle line, left picture),
- warped, non-blended partial image on the projection surface (lower line, left picture),
- warped blended partial image on the projection surface (lower line, right picture).

Application Fields

The automatic multi-projector calibration presented herein can be used anyplace where large-scaled projections of high quality are to be produced at low costs and without consuming much time (fairs, showrooms, HD TV, digital cinema). With the calibration presented herein, a geometry rectification as well as an image stitching and an image blending are performed. With the method presented herein, the auto-calibration of a 2×2 cluster takes about 1 minute including the image capturing (about 30 seconds) with standard PC components. Thus, it represents a significant increase over the manual calibration.

The invention claimed is:

1. A method for automatically calibrating a multi-projector system with at least two projectors for projecting images onto a projection surface, a digital camera for picking up the projection surface, and a control unit for controlling the projectors and the camera, an auto-calibration being performed according to the following steps:
   - projecting single-strip patterns of intersecting lines parallel in groups onto the projection surface by each of the projectors, the positions of the line intersection points of the single-strip pattern in the image to be projected being known,
   - capturing the projected single-strip patterns by means of the camera,
   - filtering the captured single-strip patterns for compensating for background noise, ambient light and/or optical distortions of the single-strip patterns caused by the camera and for detecting the line intersection points of the captured single-strip patterns,
   - detecting the largest projection surface possible on the basis of the captured single-strip patterns,
   - comparing the positions of the line intersection points within the captured single-strip patterns with the known position of the line intersection points of the single-strip patterns to be projected by the projectors in order to detect correction data for correcting distortions occurring as a consequence of unevennesses of the projection surface,
   - calculating warp fields and image warping corresponding to the correction data.

2. Method for automatically calibrating a multi-projector system according to claim 1, characterized in that for the purpose of increasing the total luminosity of the projection, the projection surfaces produced by the individual projectors overlap as completely as possible, the largest common projection surface possible being determined within the overlapping area of the projection surface of all the projectors as a rectangular surface in particular.

3. Method for automatically calibrating a multi-projector system according to claim 1, characterized in that the projection surfaces produced by the individual projectors partially overlap, the largest projection surface possible being arranged within the overall area of the individual projection surfaces of all the projectors and comprising them as well as the overlapping area and being determined as a rectangular surface in particular.

4. A system for the automatic calibration of a multi-projector system according to claim 3, characterized in that the luminosity of the projectors is reduced within their overlapping areas and is thus adapted to the luminosity of the projectors within the non-overlapping projection surface areas respectively allocated thereto.

* * * * *

UNITED STATES PATENT AND TRADEMARK OFFICE
CERTIFICATE OF CORRECTION

PATENT NO. : 7,215,362 B2  Page 1 of 1
APPLICATION NO. : 10/696945
DATED : May 8, 2007
INVENTOR(S) : Stefan Klose It is certified that error appears in the above-identified patent and that said Letters Patent is hereby corrected as shown below:

On Column 2, line 58, "patters" should read --patterns--.

Signed and Sealed this

Eighteenth Day of November, 2008

JON W. DUDAS
*Director of the United States Patent and Trademark Office*